US010864653B2

(12) United States Patent
Hand (10) Patent No.: US 10,864,653 B2
(45) Date of Patent: Dec. 15, 2020

(54) WOOD PARTICLE BOARDS (71) Applicant: KNAUF INSULATION SPRL, Vise (BE)

(72) Inventor: Richard Hand, St. Helens-Merseyside (GB)

(*) Notice: Subject to any disclaimer, the term of this patent is extended or adjusted under 35 U.S.C. 154(b) by 189 days.

(21) Appl. No.: 15/765,840

(22) PCT Filed: Oct. 7, 2016

(86) PCT No.: PCT/EP2016/074031
§ 371 (c)(1),
(2) Date: Apr. 4, 2018

(87) PCT Pub. No.: WO2017/060447
PCT Pub. Date: Apr. 13, 2017

(65) Prior Publication Data
US 2018/0297231 A1 Oct. 18, 2018

(30) Foreign Application Priority Data
Oct. 9, 2015 (GB) .................................. 1517867.6

(51) Int. Cl.
B27N 3/00 (2006.01)
B27N 1/02 (2006.01)
B27N 3/02 (2006.01)
C08L 97/02 (2006.01)

(52) U.S. Cl.
CPC ........... B27N 3/002 (2013.01); B27N 1/0209 (2013.01); B27N 3/02 (2013.01); B27N 3/00 (2013.01); C08L 97/02 (2013.01)

(58) Field of Classification Search
None
See application file for complete search history.

(56) References Cited

U.S. PATENT DOCUMENTS

| | | |
|---|---|---|
| 1,801,052 A | 4/1931 | Meigs |
| 1,801,053 A | 4/1931 | Meigs |
| 1,886,353 A | 11/1932 | Novotny |
| 1,902,948 A | 3/1933 | Castle |
| 1,964,263 A | 6/1934 | Krenke |
| 2,198,874 A | 4/1940 | Leighton |
| 2,215,825 A | 9/1940 | Wallace |
| 2,261,295 A | 11/1941 | Schlack |
| 2,362,086 A | 11/1944 | Eastes |
| 2,371,990 A | 3/1945 | Hanford |
| 2,392,105 A | 1/1946 | Sussman |
| 2,442,989 A | 6/1948 | Sussman |
| 2,500,665 A | 3/1950 | Courtright |
| 2,518,956 A | 8/1950 | Sussman |
| 2,875,073 A | 2/1959 | Gogek |
| 2,894,920 A | 7/1959 | Ramos |
| 2,965,504 A | 12/1960 | Gogek |
| 3,038,462 A | 6/1962 | Bohdan |
| 3,138,473 A | 6/1964 | Floyd |
| 3,222,243 A | 12/1965 | Gaston |
| 3,231,349 A | 1/1966 | Stalego |
| 3,232,821 A | 2/1966 | Banks |
| 3,297,419 A | 1/1967 | Eyre, Jr. |
| 3,513,001 A | 5/1970 | Woodhead |
| 3,551,365 A | 12/1970 | Matalon |
| 3,784,408 A | 1/1974 | Jaffe |
| 3,791,807 A | 2/1974 | Etzel |
| 3,802,897 A | 4/1974 | Bovier |
| 3,809,664 A | 5/1974 | Burr |
| 3,826,767 A | 7/1974 | Hoover |
| 3,856,606 A | 12/1974 | Fan |
| 3,867,119 A | 2/1975 | Takeo |
| 3,907,724 A | 9/1975 | Higginbottom |
| 3,911,048 A | 10/1975 | Nistri |
| 3,919,134 A | 11/1975 | Higginbottom |
| 3,922,466 A | 11/1975 | Bell |
| 3,955,031 A | 5/1976 | Jones |
| 3,956,204 A | 5/1976 | Higginbottom |
| 3,961,081 A | 6/1976 | McKenzie |
| 3,971,807 A | 7/1976 | Brack |
| 4,014,726 A | 3/1977 | Fargo |
| 4,028,290 A | 6/1977 | Reid |
| 4,048,127 A | 9/1977 | Gibbons |
| 4,054,713 A | 10/1977 | Sakaguchi |
| 4,085,076 A | 4/1978 | Gibbons |
| 4,097,427 A | 6/1978 | Aitken |
| 4,107,379 A | 8/1978 | Stofko |
| 4,109,057 A | 8/1978 | Nakamura |
| 4,144,027 A | 3/1979 | Habib |
| 4,148,765 A | 4/1979 | Nelson |
| 4,183,997 A | 1/1980 | Stofko |

(Continued)

FOREIGN PATENT DOCUMENTS

| | | |
|---|---|---|
| AU | 8538765 | 8/1985 |
| AU | 9640921 | 7/1997 |

(Continued)

OTHER PUBLICATIONS

International Search Report and Written Opinion for PCT/US2008/059730, completed Sep. 22, 2008.
International Search Report and Written Opinion for PCT/US2008/069046, completed Sep. 25, 2008.
International Search Report and Written Opinion for PCT/EP2011/059317, completed Jul. 15, 2011.
International Search Report for PCT/EP2008/060185, completed Oct. 23, 2008.
International Search Report for PCT/EP2011/057363, completed Sep. 5, 2011.
Ames, J.M., "The Maillard Browning Reaction—an Update,"Chemistry & Industry, No. 17, 1988, 4 pages.

(Continued)

*Primary Examiner* — Mary Lynn F Theisen
(74) *Attorney, Agent, or Firm* — Knauf Insulation, Inc.; James K. Blodgett; Brandon N. Hudder (57) ABSTRACT

A non-carbohydrate polyhydroxy component(s) is used in a binder composition to facilitate manufacture of wood particle boards.

18 Claims, 1 Drawing Sheet

(56) References Cited

U.S. PATENT DOCUMENTS

| | | | |
|---|---|---|---|
| 4,184,986 A | 1/1980 | Krasnobajew | |
| 4,186,053 A | 1/1980 | Krasnobajew | |
| 4,201,247 A | 5/1980 | Shannon | |
| 4,201,857 A | 5/1980 | Krasnobajew | |
| 4,217,414 A | 8/1980 | Walon | |
| 4,233,432 A | 11/1980 | Curtis, Jr. | |
| 4,246,367 A | 1/1981 | Curtis, Jr. | |
| 4,259,190 A | 3/1981 | Fahey | |
| 4,265,963 A | 5/1981 | Matalon | |
| 4,278,573 A | 7/1981 | Tessler | |
| 4,296,173 A | 10/1981 | Fahey | |
| 4,301,310 A | 11/1981 | Wagner | |
| 4,310,585 A | 1/1982 | Shannon | |
| 4,322,523 A | 3/1982 | Wagner | |
| 4,330,443 A | 5/1982 | Rankin | |
| 4,333,484 A | 6/1982 | Keritsis | |
| 4,357,194 A | 11/1982 | Stofko | |
| 4,361,588 A | 11/1982 | Herz | |
| 4,379,101 A | 4/1983 | Smith | |
| 4,393,019 A | 7/1983 | Geimer | |
| 4,396,430 A | 8/1983 | Matalon | |
| 4,400,496 A | 8/1983 | Butler | |
| 4,464,523 A | 8/1984 | Neigel | |
| 4,506,684 A | 3/1985 | Keritsis | |
| 4,520,143 A | 5/1985 | Jellinek | |
| 4,524,164 A | 6/1985 | Viswanathan | |
| 4,631,226 A | 12/1986 | Jellinek | |
| 4,654,259 A * | 3/1987 | Stofko | C08L 61/20 428/326 |
| 4,668,716 A | 5/1987 | Pepe | |
| 4,692,478 A | 9/1987 | Viswanathan | |
| 4,714,727 A | 12/1987 | Hume, III | |
| 4,720,295 A | 1/1988 | Bronshtein | |
| 4,734,996 A | 4/1988 | Kim | |
| 4,754,056 A | 6/1988 | Ansel | |
| 4,761,184 A | 8/1988 | Markessini | |
| 4,780,339 A | 10/1988 | Lacourse | |
| 4,828,643 A | 5/1989 | Newman | |
| 4,845,162 A | 7/1989 | Schmitt | |
| 4,906,237 A | 3/1990 | Johansson | |
| 4,912,147 A | 3/1990 | Pfoehler | |
| 4,918,861 A | 4/1990 | Carpenter | |
| 4,923,980 A | 5/1990 | Blomberg | |
| 4,950,444 A | 8/1990 | Deboufie | |
| 4,988,780 A | 1/1991 | Das | |
| 4,992,519 A | 2/1991 | Mukherjee | |
| 5,001,202 A | 3/1991 | Denis | |
| 5,013,405 A | 5/1991 | Izard | |
| 5,032,431 A | 7/1991 | Conner | |
| 5,037,930 A | 8/1991 | Shih | |
| 5,041,595 A | 8/1991 | Yang | |
| 5,089,342 A | 2/1992 | Dhein | |
| 5,095,054 A | 3/1992 | Lay | |
| 5,106,615 A | 4/1992 | Dikstein | |
| 5,114,004 A | 5/1992 | Isono | |
| 5,123,949 A | 6/1992 | Thiessen | |
| 5,124,369 A | 6/1992 | Vandichel | |
| 5,128,407 A | 7/1992 | Layton | |
| 5,143,582 A | 9/1992 | Arkens | |
| 5,151,465 A | 9/1992 | Le-Khac | |
| 5,167,738 A | 12/1992 | Bichot | |
| 5,198,492 A | 3/1993 | Stack | |
| 5,217,741 A | 6/1993 | Kawachi | |
| 5,218,048 A | 6/1993 | Abe | |
| 5,240,498 A | 8/1993 | Matalon | |
| 5,278,222 A | 1/1994 | Stack | |
| 5,300,144 A | 4/1994 | Adams | |
| 5,300,192 A | 4/1994 | Hansen | |
| 5,308,896 A | 5/1994 | Hansen | |
| 5,318,990 A | 6/1994 | Strauss | |
| 5,336,753 A | 8/1994 | Jung | |
| 5,336,755 A | 8/1994 | Pape | |
| 5,336,766 A | 8/1994 | Koga | |
| 5,340,868 A | 8/1994 | Strauss | |
| 5,352,480 A | 10/1994 | Hansen | |
| 5,367,849 A | 11/1994 | Bullock | |
| 5,371,194 A | 12/1994 | Ferretti | |
| 5,387,665 A | 2/1995 | Misawa | |
| 5,389,716 A | 2/1995 | Graves | |
| 5,393,849 A | 2/1995 | Srinivasan | |
| 5,416,139 A | 5/1995 | Zeiszler | |
| 5,421,838 A | 6/1995 | Gosset | |
| 5,424,418 A | 6/1995 | Duflot | |
| 5,434,233 A | 7/1995 | Kiely | |
| 5,447,977 A | 9/1995 | Hansen | |
| 5,470,843 A | 11/1995 | Stahl | |
| 5,480,973 A | 1/1996 | Goodlad | |
| 5,492,756 A | 2/1996 | Seale | |
| 5,498,662 A | 3/1996 | Tanaka | |
| 5,503,920 A | 4/1996 | Alkire | |
| 5,534,612 A | 7/1996 | Taylor | |
| 5,536,766 A | 7/1996 | Seyffer | |
| 5,538,783 A | 7/1996 | Hansen | |
| 5,543,215 A | 8/1996 | Hansen | |
| 5,545,279 A | 8/1996 | Hall | |
| 5,547,541 A | 8/1996 | Hansen | |
| 5,547,745 A | 8/1996 | Hansen | |
| 5,550,189 A | 8/1996 | Qin | |
| 5,554,730 A | 9/1996 | Woiszwillo | |
| 5,562,740 A | 10/1996 | Cook | |
| 5,571,618 A | 11/1996 | Hansen | |
| 5,578,678 A | 11/1996 | Hartmann | |
| 5,580,856 A | 12/1996 | Prestrelski | |
| 5,582,682 A | 12/1996 | Ferretti | |
| 5,583,193 A | 12/1996 | Aravindakshan | |
| 5,589,256 A | 12/1996 | Hansen | |
| 5,589,536 A | 12/1996 | Golino | |
| 5,607,759 A | 3/1997 | Hansen | |
| 5,608,011 A | 3/1997 | Eck | |
| 5,609,727 A | 3/1997 | Hansen | |
| 5,614,570 A | 3/1997 | Hansen | |
| 5,620,940 A | 4/1997 | Birbara | |
| 5,621,026 A | 4/1997 | Tanaka | |
| 5,633,298 A | 5/1997 | Arfaei | |
| 5,641,561 A | 6/1997 | Hansen | |
| 5,643,978 A | 7/1997 | Darwin | |
| 5,645,756 A | 7/1997 | Dubin | |
| 5,660,904 A | 8/1997 | Andersen | |
| 5,661,213 A | 8/1997 | Arkens | |
| 5,670,585 A | 9/1997 | Taylor | |
| 5,672,418 A | 9/1997 | Hansen | |
| 5,672,659 A | 9/1997 | Shalaby | |
| 5,690,715 A | 11/1997 | Schiwek | |
| 5,691,060 A | 11/1997 | Levy | |
| 5,693,411 A | 12/1997 | Hansen | |
| 5,719,092 A | 2/1998 | Arrington | |
| 5,719,228 A | 2/1998 | Taylor | |
| 5,733,624 A | 3/1998 | Syme | |
| 5,756,580 A | 5/1998 | Natori | |
| 5,763,524 A | 6/1998 | Arkens | |
| 5,788,243 A | 8/1998 | Harshaw | |
| 5,788,423 A | 8/1998 | Perkins | |
| 5,807,364 A | 9/1998 | Hansen | |
| 5,855,987 A | 1/1999 | Margel | |
| 5,863,985 A | 1/1999 | Shalaby | |
| 5,885,337 A | 3/1999 | Nohr | |
| 5,895,804 A | 4/1999 | Lee | |
| 5,905,115 A | 5/1999 | Luitjes | |
| 5,916,503 A | 6/1999 | Rettenbacher | |
| 5,919,528 A | 7/1999 | Huijs | |
| 5,919,831 A | 7/1999 | Philipp | |
| 5,922,403 A | 7/1999 | Tecle | |
| 5,925,722 A | 7/1999 | Exner | |
| 5,929,184 A | 7/1999 | Holmes-Farley | |
| 5,929,196 A | 7/1999 | Kissel | |
| 5,932,344 A | 8/1999 | Ikemoto | |
| 5,932,665 A | 8/1999 | Deporter | |
| 5,932,689 A | 8/1999 | Arkens | |
| 5,942,123 A | 8/1999 | McArdle | |
| 5,954,869 A | 9/1999 | Elfersy | |
| 5,977,224 A | 11/1999 | Cheung | |
| 5,977,232 A | 11/1999 | Arkens | |
| 5,981,719 A | 11/1999 | Woiszwillo | |
| 5,983,586 A | 11/1999 | Berdan, II | |

(56) References Cited

U.S. PATENT DOCUMENTS

| | | |
|---|---|---|
| 5,990,216 A | 11/1999 | Cai |
| 5,993,709 A | 11/1999 | Bonomo |
| 6,022,615 A | 2/2000 | Rettenbacher |
| 6,067,821 A | 5/2000 | Jackson |
| 6,071,549 A | 6/2000 | Hansen |
| 6,071,994 A | 6/2000 | Hummerich |
| 6,072,086 A | 6/2000 | James |
| 6,077,883 A | 6/2000 | Taylor |
| 6,090,925 A | 7/2000 | Woiszwillo |
| 6,114,033 A | 9/2000 | Ikemoto |
| 6,114,464 A | 9/2000 | Reck |
| 6,133,347 A | 10/2000 | Vickers, Jr. |
| 6,136,916 A | 10/2000 | Arkens |
| 6,139,619 A | 10/2000 | Zaretskiy |
| 6,143,243 A | 11/2000 | Gershun |
| 6,171,444 B1 | 1/2001 | Nigam |
| 6,171,654 B1 | 1/2001 | Salsman |
| 6,180,037 B1 | 1/2001 | Andersen |
| 6,194,512 B1 | 2/2001 | Chen |
| 6,210,472 B1 | 4/2001 | Kwan |
| 6,221,958 B1 | 4/2001 | Shalaby |
| 6,221,973 B1 | 4/2001 | Arkens |
| 6,231,721 B1 | 5/2001 | Quick |
| 6,274,661 B1 | 8/2001 | Chen |
| 6,281,298 B1 | 8/2001 | Papsin, Jr. |
| 6,299,677 B1 | 10/2001 | Johnson |
| 6,299,936 B1 | 10/2001 | Reck |
| 6,307,732 B1 | 10/2001 | Tsubaki |
| 6,310,227 B1 | 10/2001 | Sarama |
| 6,313,102 B1 | 11/2001 | Colaco |
| 6,319,683 B1 | 11/2001 | James |
| 6,331,350 B1 | 12/2001 | Taylor |
| 6,331,513 B1 | 12/2001 | Zaid |
| 6,340,411 B1 | 1/2002 | Hansen |
| 6,348,530 B1 | 2/2002 | Reck |
| 6,365,079 B1 | 4/2002 | Winkler |
| 6,372,077 B1 | 4/2002 | Tecle |
| 6,379,739 B1 | 4/2002 | Formanek |
| 6,379,814 B1 | 4/2002 | Dupre |
| 6,395,856 B1 | 5/2002 | Petty |
| 6,403,665 B1 | 6/2002 | Sieker |
| 6,407,225 B1 | 6/2002 | Mang |
| 6,410,036 B1 | 6/2002 | De Rosa |
| 6,440,204 B1 | 8/2002 | Rogols |
| 6,441,122 B1 | 8/2002 | Demott |
| 6,461,553 B1 | 10/2002 | Hansen |
| 6,468,442 B2 | 10/2002 | Bytnar |
| 6,468,730 B2 | 10/2002 | Fujiwara |
| 6,469,120 B1 | 10/2002 | Elfersy |
| 6,475,552 B1 | 11/2002 | Shah |
| 6,482,875 B2 | 11/2002 | Lorenz |
| 6,495,656 B1 | 12/2002 | Haile |
| 6,521,339 B1 | 2/2003 | Hansen |
| 6,525,009 B2 | 2/2003 | Sachdev |
| 6,538,057 B1 | 3/2003 | Wildburg |
| 6,547,867 B2 | 4/2003 | Rogols |
| 6,555,616 B1 | 4/2003 | Helbing |
| 6,559,302 B1 | 5/2003 | Shah |
| 6,562,267 B1 | 5/2003 | Hansen |
| 6,596,103 B1 | 7/2003 | Hansen |
| 6,613,378 B1 | 9/2003 | Erhan |
| 6,638,882 B1 | 10/2003 | Helbing |
| 6,638,884 B2 | 10/2003 | Quick |
| 6,699,945 B1 | 3/2004 | Chen |
| 6,706,853 B1 | 3/2004 | Stanssens |
| 6,719,862 B2 | 4/2004 | Quick |
| 6,730,730 B1 | 5/2004 | Hansen |
| 6,753,361 B2 | 6/2004 | Kroner |
| 6,818,694 B2 | 11/2004 | Hindi |
| 6,821,547 B2 | 11/2004 | Shah |
| 6,852,247 B2 | 2/2005 | Bytnar |
| 6,858,074 B2 | 2/2005 | Anderson |
| 6,861,495 B2 | 3/2005 | Barsotti |
| 6,864,044 B2 | 3/2005 | Ishikawa |
| 6,878,800 B2 | 4/2005 | Husemoen |
| 6,884,849 B2 | 4/2005 | Chen |
| 6,955,844 B2 | 10/2005 | Tagge |
| 6,962,714 B2 | 11/2005 | Hei |
| 6,989,171 B2 | 1/2006 | Portman |
| 6,992,203 B2 | 1/2006 | Trusovs |
| 7,018,490 B2 | 3/2006 | Hansen |
| 7,029,717 B1 | 4/2006 | Ojima |
| 7,067,579 B2 | 6/2006 | Taylor |
| 7,083,831 B1 | 8/2006 | Koch |
| 7,090,745 B2 | 8/2006 | Beckman |
| 7,141,626 B2 | 11/2006 | Rodrigues |
| 7,144,474 B1 | 12/2006 | Hansen |
| 7,195,792 B2 | 3/2007 | Boston |
| 7,201,778 B2 | 4/2007 | Smith |
| 7,201,825 B2 | 4/2007 | Dezutter |
| 7,202,326 B2 | 4/2007 | Kuroda |
| 7,241,487 B2 | 7/2007 | Taylor |
| 7,458,235 B2 | 12/2008 | Beaufils |
| 7,514,027 B2 | 4/2009 | Horres |
| 7,655,711 B2 | 2/2010 | Swift |
| 7,772,347 B2 | 8/2010 | Swift |
| 7,795,354 B2 | 9/2010 | Srinivasan |
| 7,803,879 B2 | 9/2010 | Srinivasan |
| 7,807,771 B2 | 10/2010 | Swift |
| 7,842,382 B2 | 11/2010 | Helbing |
| 7,854,980 B2 | 12/2010 | Jackson |
| 7,883,693 B2 | 2/2011 | Sehl |
| 7,888,445 B2 | 2/2011 | Swift |
| 7,947,765 B2 | 5/2011 | Swift |
| 8,114,210 B2 | 2/2012 | Hampson |
| 8,182,648 B2 | 5/2012 | Swift |
| 8,211,923 B2 | 7/2012 | Wagner |
| 8,372,900 B2 | 2/2013 | Shooshtari |
| 8,377,564 B2 | 2/2013 | Shooshtari |
| 8,501,838 B2 | 8/2013 | Jackson |
| 8,680,224 B2 | 3/2014 | Zhang |
| 8,691,934 B2 | 4/2014 | Helbing |
| 8,900,495 B2 | 12/2014 | Pacorel |
| 2001/0017427 A1 | 8/2001 | Rosthauser |
| 2001/0046824 A1 | 11/2001 | Nigam |
| 2002/0000100 A1 | 1/2002 | Burg |
| 2002/0025435 A1 | 2/2002 | Hansen |
| 2002/0026025 A1 | 2/2002 | Kuo |
| 2002/0028857 A1 | 3/2002 | Holy |
| 2002/0032253 A1 | 3/2002 | Lorenz |
| 2002/0042473 A1 | 4/2002 | Trollsas |
| 2002/0091185 A1 | 7/2002 | Taylor |
| 2002/0096278 A1 | 7/2002 | Foster |
| 2002/0123598 A1 | 9/2002 | Sieker |
| 2002/0130439 A1 | 9/2002 | Kroner |
| 2002/0161108 A1 | 10/2002 | Schultz |
| 2002/0197352 A1 | 12/2002 | Portman |
| 2003/0005857 A1 | 1/2003 | Minami |
| 2003/0040239 A1 | 2/2003 | Toas |
| 2003/0044513 A1 | 3/2003 | Shah |
| 2003/0066523 A1 | 4/2003 | Lewis |
| 2003/0071879 A1 | 4/2003 | Swenson |
| 2003/0116294 A1 | 6/2003 | Kehrer |
| 2003/0134945 A1 | 7/2003 | Capps |
| 2003/0148084 A1 | 8/2003 | Trocino |
| 2003/0153690 A1 | 8/2003 | Husemoen |
| 2003/0185991 A1 | 10/2003 | Wigger |
| 2003/0203117 A1 | 10/2003 | Bartkowiak |
| 2004/0002567 A1 | 1/2004 | Chen |
| 2004/0019168 A1 | 1/2004 | Soerens |
| 2004/0024170 A1 | 2/2004 | Husemoen |
| 2004/0033269 A1 | 2/2004 | Hei |
| 2004/0033747 A1 | 2/2004 | Miller |
| 2004/0034154 A1 | 2/2004 | Tutin |
| 2004/0038017 A1 | 2/2004 | Tutin |
| 2004/0048531 A1 | 3/2004 | Belmares |
| 2004/0077055 A1 | 4/2004 | Fosdick |
| 2004/0079499 A1 | 4/2004 | Dezutter |
| 2004/0087024 A1 | 5/2004 | Bellocq |
| 2004/0087719 A1 | 5/2004 | Rautschek |
| 2004/0122166 A1 | 6/2004 | O'Brien-Bernini |
| 2004/0131874 A1 | 7/2004 | Tutin |
| 2004/0144706 A1 | 7/2004 | Beaufils |
| 2004/0152824 A1 | 8/2004 | Dobrowolski |

(56) References Cited

U.S. PATENT DOCUMENTS

| | | | |
|---|---|---|---|
| 2004/0161993 A1 | 8/2004 | Tripp | |
| 2004/0209851 A1 | 10/2004 | Nelson | |
| 2004/0213930 A1 | 10/2004 | Halabisky | |
| 2004/0220368 A1 | 11/2004 | Li | |
| 2004/0249066 A1 | 12/2004 | Heinzman | |
| 2004/0254285 A1 | 12/2004 | Rodrigues | |
| 2004/0260082 A1 | 12/2004 | Van Der Wilden | |
| 2005/0001198 A1 | 1/2005 | Bytnar | |
| 2005/0017394 A1 | 1/2005 | Hochsmann | |
| 2005/0027283 A1 | 2/2005 | Richard | |
| 2005/0033037 A1 | 2/2005 | Trusovs | |
| 2005/0048212 A1 | 3/2005 | Clamen | |
| 2005/0059770 A1 | 3/2005 | Srinivasan | |
| 2005/0171085 A1 | 8/2005 | Pinto | |
| 2005/0196421 A1 | 9/2005 | Hunter | |
| 2005/0202224 A1 | 9/2005 | Helbing | |
| 2005/0208852 A1 | 9/2005 | Weber | |
| 2005/0215153 A1 | 9/2005 | Cossement | |
| 2005/0245669 A1 | 11/2005 | Clungeon | |
| 2005/0275133 A1 | 12/2005 | Cabell | |
| 2005/0288479 A1 | 12/2005 | Kuroda | |
| 2006/0005580 A1 | 1/2006 | Espiard | |
| 2006/0009569 A1 | 1/2006 | Charbonneau | |
| 2006/0044302 A1 | 3/2006 | Chen | |
| 2006/0099870 A1 | 5/2006 | Garcia | |
| 2006/0111480 A1 | 5/2006 | Hansen | |
| 2006/0124538 A1 | 6/2006 | Morcrette | |
| 2006/0135433 A1 | 6/2006 | Murray | |
| 2006/0141177 A1 | 6/2006 | Ligtenberg | |
| 2006/0179892 A1 | 8/2006 | Horres | |
| 2006/0188465 A1 | 8/2006 | Perrier | |
| 2006/0198954 A1 | 9/2006 | Frechem | |
| 2006/0231487 A1 | 10/2006 | Bartley | |
| 2006/0252855 A1 | 11/2006 | Pisanova | |
| 2006/0281622 A1 | 12/2006 | Maricourt | |
| 2007/0006390 A1 | 1/2007 | Clamen | |
| 2007/0009582 A1 | 1/2007 | Madsen | |
| 2007/0027281 A1 | 2/2007 | Michl | |
| 2007/0027283 A1* | 2/2007 | Swift | F16L 59/14 527/312 |
| 2007/0039520 A1 | 2/2007 | Crews | |
| 2007/0082983 A1 | 4/2007 | Crews | |
| 2007/0123679 A1 | 5/2007 | Swift | |
| 2007/0123680 A1 | 5/2007 | Swift | |
| 2007/0129522 A1 | 6/2007 | Burckhardt | |
| 2007/0142596 A1 | 6/2007 | Swift | |
| 2007/0158022 A1 | 7/2007 | Heep | |
| 2007/0184740 A1 | 8/2007 | Keller | |
| 2007/0191574 A1 | 8/2007 | Miller | |
| 2007/0270070 A1 | 11/2007 | Othman | |
| 2007/0287018 A1 | 12/2007 | Tutin | |
| 2007/0292618 A1 | 12/2007 | Srinivasan | |
| 2007/0292619 A1 | 12/2007 | Srinivasan | |
| 2007/0298274 A1 | 12/2007 | Eriksson | |
| 2008/0009209 A1 | 1/2008 | Clamen | |
| 2008/0009616 A1 | 1/2008 | Frank | |
| 2008/0051539 A1 | 2/2008 | Kelly | |
| 2008/0060551 A1 | 3/2008 | Crews | |
| 2008/0081138 A1 | 4/2008 | Moore | |
| 2008/0108741 A1 | 5/2008 | Van Herwijnen | |
| 2008/0160260 A1 | 7/2008 | Wada | |
| 2008/0160302 A1 | 7/2008 | Asrar | |
| 2008/0194738 A1 | 8/2008 | Crews | |
| 2009/0169867 A1 | 7/2009 | Kelly | |
| 2009/0170978 A1 | 7/2009 | Kelly | |
| 2009/0227732 A1 | 9/2009 | Glockner | |
| 2009/0301972 A1 | 12/2009 | Hines | |
| 2009/0304919 A1 | 12/2009 | Huenig | |
| 2009/0306255 A1 | 12/2009 | Patel | |
| 2009/0324915 A1 | 12/2009 | Swift | |
| 2010/0029160 A1 | 2/2010 | Srinivasan | |
| 2010/0058661 A1 | 3/2010 | Jackson | |
| 2010/0080976 A1 | 4/2010 | Jackson | |
| 2010/0084598 A1 | 4/2010 | Jackson | |
| 2010/0086726 A1 | 4/2010 | Jackson | |
| 2010/0087571 A1* | 4/2010 | Jackson | C08L 97/02 524/13 |
| 2010/0098947 A1 | 4/2010 | Inoue | |
| 2010/0117023 A1 | 5/2010 | Dopico | |
| 2010/0129640 A1 | 5/2010 | Kelly | |
| 2010/0130649 A1 | 5/2010 | Swift | |
| 2010/0175826 A1 | 7/2010 | Huenig | |
| 2010/0210595 A1 | 8/2010 | Wagner | |
| 2010/0222463 A1 | 9/2010 | Brady | |
| 2010/0222566 A1 | 9/2010 | Fosdick | |
| 2010/0240805 A1 | 9/2010 | Miller et al. | |
| 2010/0282996 A1 | 11/2010 | Jaffrennou | |
| 2010/0301256 A1 | 12/2010 | Hampson | |
| 2010/0320113 A1* | 12/2010 | Swift | C08F 251/00 206/524.1 |
| 2011/0021672 A1 | 1/2011 | Crews | |
| 2011/0039111 A1 | 2/2011 | Shooshtari | |
| 2011/0040010 A1 | 2/2011 | Shooshtari | |
| 2011/0042303 A1 | 2/2011 | Shooshtari | |
| 2011/0045966 A1 | 2/2011 | Shooshtari | |
| 2011/0089074 A1 | 4/2011 | Jackson | |
| 2011/0135937 A1 | 6/2011 | Swift | |
| 2011/0190425 A1 | 8/2011 | Swift | |
| 2011/0220835 A1 | 9/2011 | Swift | |
| 2011/0256790 A1 | 10/2011 | Toas | |
| 2011/0260094 A1 | 10/2011 | Hampson | |
| 2011/0262648 A1 | 10/2011 | Lee | |
| 2011/0263757 A1 | 10/2011 | Rand | |
| 2011/0306726 A1 | 12/2011 | Bailey | |
| 2012/0133073 A1 | 5/2012 | Pacorel | |
| 2012/0156954 A1 | 6/2012 | Eckert | |
| 2013/0029150 A1 | 1/2013 | Appley | |
| 2013/0032749 A1 | 2/2013 | Jaffrennou | |
| 2013/0047888 A1* | 2/2013 | Mueller | C08G 14/00 106/163.01 |
| 2013/0059075 A1 | 3/2013 | Appley | |
| 2013/0082205 A1 | 4/2013 | Mueller | |
| 2013/0174758 A1 | 7/2013 | Mueller | |
| 2013/0234362 A1 | 9/2013 | Swift | |
| 2013/0236650 A1 | 9/2013 | Swift | |
| 2013/0237113 A1 | 9/2013 | Swift | |
| 2013/0244524 A1 | 9/2013 | Swift | |
| 2014/0091247 A1 | 4/2014 | Jackson | |
| 2014/0134909 A1 | 5/2014 | Guo | |
| 2014/0357787 A1 | 12/2014 | Jobber | |
| 2015/0224671 A1 | 8/2015 | Hand et al. | |
| 2015/0267055 A1 | 9/2015 | Jackson et al. | |
| 2015/0284568 A1 | 10/2015 | Sniady et al. | |
| 2015/0315339 A1 | 11/2015 | Pacorel | |

FOREIGN PATENT DOCUMENTS

| | | |
|---|---|---|
| CA | 1090026 | 11/1980 |
| CA | 2037214 | 9/1991 |
| CA | 2232334 | 11/1998 |
| CA | 2458333 | 12/1999 |
| CA | 2278946 | 1/2000 |
| CA | 2470783 | 12/2004 |
| CN | 1251738 | 5/2000 |
| DE | 1905054 | 8/1969 |
| DE | 4142261 | 6/1993 |
| DE | 4233622 | 4/1994 |
| DE | 4308089 | 9/1994 |
| DE | 102004011231 | 8/2005 |
| DE | 102004033561 | 9/2005 |
| DE | 102005023431 | 11/2006 |
| EP | 0044614 A2 | 1/1982 |
| EP | 0099801 | 2/1984 |
| EP | 354023 | 2/1990 |
| EP | 0461995 | 12/1991 |
| EP | 0524518 A2 | 1/1993 |
| EP | 0547819 A2 | 6/1993 |
| EP | 0583086 A1 | 2/1994 |
| EP | 0714754 A2 | 6/1996 |
| EP | 796681 | 9/1997 |
| EP | 0826710 A2 | 3/1998 |
| EP | 856494 | 8/1998 |
| EP | 0873976 A1 | 10/1998 |
| EP | 878135 | 11/1998 |

(56) References Cited

FOREIGN PATENT DOCUMENTS

| | | |
|---|---|---|
| EP | 0882756 A2 | 12/1998 |
| EP | 0911361 A1 | 4/1999 |
| EP | 915811 | 5/1999 |
| EP | 936060 | 8/1999 |
| EP | 976866 | 2/2000 |
| EP | 0990729 A1 | 4/2000 |
| EP | 1038433 A1 | 9/2000 |
| EP | 1193288 A1 | 4/2002 |
| EP | 1084167 | 9/2002 |
| EP | 1268702 | 1/2003 |
| EP | 1382642 | 1/2004 |
| EP | 1486547 A2 | 12/2004 |
| EP | 1522642 | 4/2005 |
| EP | 1698598 A1 | 9/2006 |
| EP | 1767566 | 4/2007 |
| EP | 2223941 | 9/2010 |
| EP | 2253663 | 11/2010 |
| FR | 2614388 | 10/1988 |
| GB | 770561 | 3/1957 |
| GB | 809675 | 3/1959 |
| GB | 926749 | 5/1963 |
| GB | 1391172 | 4/1975 |
| GB | 1469331 | 4/1977 |
| GB | 1512066 | 5/1978 |
| GB | 1525541 | 9/1978 |
| GB | 2047258 | 11/1980 |
| GB | 2078805 A | 1/1982 |
| GB | 2136008 | 9/1984 |
| GB | 2173523 | 10/1986 |
| GB | 2251438 | 7/1992 |
| JP | 53113784 | 10/1978 |
| JP | 57101100 | 6/1982 |
| JP | 5811193 | 1/1983 |
| JP | 61195647 | 8/1986 |
| JP | 3-173680 | 7/1991 |
| JP | 05186635 | 7/1993 |
| JP | 7-034023 | 2/1995 |
| JP | 09157627 | 6/1997 |
| JP | 10234314 | 9/1998 |
| JP | 11035491 | 2/1999 |
| JP | 11181690 | 7/1999 |
| JP | 2000327841 | 11/2000 |
| JP | 2002293576 | 9/2002 |
| JP | 2003147276 | 5/2003 |
| JP | 2003238921 | 8/2003 |
| JP | 2004060058 | 2/2004 |
| JP | 2005306919 | 11/2005 |
| NZ | 549563 | 1/2008 |
| RU | 1765996 | 8/1995 |
| SU | 374400 | 3/1973 |
| WO | 1990007541 | 7/1990 |
| WO | 1992012198 | 7/1992 |
| WO | 1995034517 | 12/1995 |
| WO | 1997049646 | 12/1997 |
| WO | 1999036368 | 7/1999 |
| WO | 199947765 | 9/1999 |
| WO | 199960042 | 11/1999 |
| WO | 199960043 | 11/1999 |
| WO | 200058085 | 10/2000 |
| WO | 2001014491 | 3/2001 |
| WO | 2001059026 | 8/2001 |
| WO | 200200429 | 1/2002 |
| WO | 200206178 | 1/2002 |
| WO | 2003029496 | 4/2003 |
| WO | 2003071879 | 9/2003 |
| WO | 2003106561 | 12/2003 |
| WO | 2004007615 | 1/2004 |
| WO | 2004076734 | 9/2004 |
| WO | 2005087837 | 9/2005 |
| WO | 2006044302 | 4/2006 |
| WO | 2006136614 | 12/2006 |
| WO | 2007014236 | 2/2007 |
| WO | 2007024020 A1 | 3/2007 |
| WO | 2007050964 | 5/2007 |
| WO | 2007088245 | 8/2007 |
| WO | 2007112335 | 10/2007 |
| WO | 2008089847 | 7/2008 |
| WO | 2008089851 | 7/2008 |
| WO | 2008141201 | 11/2008 |
| WO | 2009019235 | 2/2009 |
| WO | 2009129084 | 10/2009 |
| WO | 2010027937 | 3/2010 |
| WO | 2010139899 | 12/2010 |
| WO | 2011019590 | 2/2011 |
| WO | 2011019593 | 2/2011 |
| WO | 2011019597 | 2/2011 |
| WO | 2011019598 | 2/2011 |
| WO | 2011022224 | 2/2011 |
| WO | 2011022226 | 2/2011 |
| WO | 2011022227 | 2/2011 |
| WO | 2011138458 | 11/2011 |
| WO | 2011138459 | 11/2011 |
| WO | 2013150123 | 10/2013 |
| WO | WO 2014/027115 | * 2/2014 |

OTHER PUBLICATIONS

"Gamma-aminopropyltrimethoxysilane," Hawley's Condensed Chemical Dictionary, 14th Edition, John Wiley & Sons, Inc., 2002, 1 page.
Hodge, J.E., Chemistry of Browning Reactions in Model Systems, 1953, J. Agric. Food Chem., vol. 1, No. 15, pp. 928-943.
Agyei-Aye et al., "The Role of Anion in the Reaction of Reducing Sugars with Ammonium Salts," Carbohydrate Research 2002, 337: 2273-2277.
Laroque et al., "Kinetic study on the Maillard reaction. Consideration of sugar reactivity," Food Chemistry 2008, 111: 1032-1042.
Bjorksten et al., "Polyester Resin—Glass Fiber Laminates," Industrial and Engineering Chemistry (1954).
Dow Corning, "A Guide to Silane Solutions," 2005.
Knauf Data Sheet, 2006.
Molasses Corporation, United States Sugar Corporation, http://www.suga-lik.com/molasses/composition.html (Sep. 29, 2003).
Clamen, Guy, "Acrylic Thermosets: A Safe Alternative to Formaldehyde Resins," Nonwovens World, Apr.-May 2004, pp. 96-102.
Opposition to AU 2006272595, Amended Statement of Grounds and Particulars, issued from Australian Patent Office, Jul. 6, 2012, 22 pages.
Decision re Opposition to AU 2006272595, issued from Australian Patent Office, Aug. 14, 2015, 25 pages.
Opposition to EP 1732968, Notice of Opposition: Prior Art, Scope of the Patent, Reasons for the Opposition, issued from European Patent Office, Mar. 8, 2012, 18 pages.
Decision re Opposition to EP 1732968, issued from the European Patent Office, Nov. 14, 2014, 5 pages.
Opposition to EA 019802, submitted to Eurasian Patent Office on Dec. 26, 2014, 36 pages.
Decision re Opposition to EA 019802, issued by Eurasian Patent Office on Aug. 18, 2015, 15 pages.
Owens Corning Retiree Update: What Goes Around, Comes Around: A tale of Natural Binders, revised Mar. 20, 2013 p. 4.
A.P. Bryant, "The Terminology of Sugars," Industrial and Engineering Chemistry, vol. 26, No. 2, p. 231, Feb. 1934.
Food Flavor Chemistry, p. 162, Mar. 21, 2009 (English Abstract).
Viswanathan, T., "Chapter 28: Thermosetting Adhesive Resins from Whey and Whey Byproducts," in Adhesives from Renewable Resources, ACS Symposium Series, Hemingway, R.W., et al. (Eds.), American Chemical Society, Washington, DC (1989).
Viswanathan, T., and Richardson, T., "Thermosetting Adhesive Resins from Whey and Whey Byproducts," Ind. Eng. Chem. Prod. Res. Dev. 23:644-47, American Chemical Society, United States (1984).
Residential Energy Conservation: vol. 1, Congress of the U.S., Office of Technology Assessment (Ed.), 357 pages (Jan. 1, 1979).
Office action for co-pending U.S. Appl. No. 12/524,502 (9 pages)—dated Sep. 21, 2012.
Office action for co-pending U.S. Appl. No. 12/524,502 (9 pages)—dated Apr. 4, 2013.
Office action for co-pending U.S. Appl. No. 12/524,512 (7 pages)—dated Aug. 6, 2012.

(56) References Cited

OTHER PUBLICATIONS

Office action for co-pending U.S. Appl. No. 12/524,512 (9 pages)—dated Apr. 1, 2013.
Office action for co-pending U.S. Appl. No. 12/524,512 (14 pages)—dated Nov. 12, 2014.
Office action for co-pending U.S. Appl. No. 12/524,512 (9 pages)—dated Jul. 10, 2015.
Office action for co-pending U.S. Appl. No. 12/524,512 (10 pages)—dated Mar. 23, 2016.
Office action for co-pending U.S. Appl. No. 12/524,512 (13 pages)—dated Oct. 5, 2016.
Office action for co-pending U.S. Appl. No. 12/524,512 (13 pages)—dated Apr. 6, 2018.
Office action for co-pending U.S. Appl. No. 12/524,512 (15 pages)—dated Jan. 17, 2019.
Office action for co-pending U.S. Appl. No. 12/524,469 (7 pages)—dated Jun. 7, 2012.
Office action for co-pending U.S. Appl. No. 12/524,469 (8 pages)—dated Jan. 29, 2013.
Office action for co-pending U.S. Appl. No. 12/524,469 (7 pages)—dated Aug. 20, 2013.
Office action for co-pending U.S. Appl. No. 12/524,469 (9 pages)—dated Jun. 9, 2014.
Office action for co-pending U.S. Appl. No. 12/524,469 (9 pages)—dated Oct. 17, 2014.
Office action for co-pending U.S. Appl. No. 12/524,469 (9 pages)—dated Jul. 23, 2015.
Office action for co-pending U.S. Appl. No. 12/524,539 (13 pages)—dated Jun. 21, 2012.
Office action for co-pending U.S. Appl. No. 12/524,539 (13 pages)—dated Jun. 6, 2013.
Office action for co-pending U.S. Appl. No. 12/524,539 (12 pages)—dated Dec. 17, 2014.
Office action for co-pending U.S. Appl. No. 12/524,539 (7 pages)—dated Jul. 15, 2015.
Office action for co-pending U.S. Appl. No. 12/524,539 (7 pages)—dated Mar. 23, 2016.
Office action for co-pending U.S. Appl. No. 12/524,539 (7 pages)—dated Dec. 29, 2016.
Office action for co-pending U.S. Appl. No. 12/524,522 (4 pages)—dated Oct. 11, 2011.
Office action for co-pending U.S. Appl. No. 12/667,718 (5 pages)—dated Sep. 3, 2013.
Office action for co-pending U.S. Appl. No. 12/667,718 (6 pages)—dated Sep. 9, 2014.
Office action for co-pending U.S. Appl. No. 12/671,922 (10 pages)—dated Oct. 7, 2011.
Office action for co-pending U.S. Appl. No. 12/671,922 (10 pages)—dated May 10, 2012.
Office action for co-pending U.S. Appl. No. 12/671,922 (9 pages)—dated Sep. 23, 2014.
Office action for co-pending U.S. Appl. No. 12/671,922 (5 pages)—dated Apr. 4, 2016.
Office action for co-pending U.S. Appl. No. 13/388,408 (5 pages)—dated Aug. 15, 2013.
Office action for co-pending U.S. Appl. No. 13/371,829 (9 pages)—dated Dec. 20, 2012.
Office action for co-pending U.S. Appl. No. 13/371,829 (6 pages)—dated Jul. 12, 2013.
Office action for co-pending U.S. Appl. No. 13/371,829 (6 pages)—dated Aug. 12, 2014.
Office action for co-pending U.S. Appl. No. 13/637,794 (8 pages)—dated Aug. 12, 2013.
Office action for co-pending U.S. Appl. No. 13/637,794 (9 pages)—dated Mar. 26, 2014.
Office action for co-pending U.S. Appl. No. 13/696,439 (11 pages)—dated Jan. 8, 2014.
Office action for co-pending U.S. Appl. No. 13/696,452 (7 pages)—dated Jan. 13, 2015.
Office action for co-pending U.S. Appl. No. 13/696,452 (9 pages)—dated Oct. 27, 2015.
Office action for co-pending U.S. Appl. No. 13/702,144 (6 pages)—dated Jan. 10, 2014.
Office action for co-pending U.S. Appl. No. 13/702,144 (7 pages)—dated Jul. 29, 2014.
Office action for co-pending U.S. Appl. No. 13/823,818 (9 pages)—dated Mar. 26, 2015.
Office action for co-pending U.S. Appl. No. 13/866,368 (16 pages)—dated Aug. 29, 2013.
Office action for co-pending U.S. Appl. No. 13/866,368 (11 pages)—dated Apr. 16, 2014.
Office action for co-pending U.S. Appl. No. 13/866,368 (8 pages)—dated Aug. 21, 2014.
Office action for co-pending U.S. Appl. No. 13/866,419 (14 pages)—dated Sep. 20, 2013.
Office action for co-pending U.S. Appl. No. 13/866,419 (10 pages)—dated Apr. 25, 2014.
Office action for co-pending U.S. Appl. No. 13/866,419 (8 pages)—dated Oct. 9, 2014.
Office action for co-pending U.S. Appl. No. 13/866,419 (8 pages)—dated Sep. 25, 2015.
Office action for co-pending U.S. Appl. No. 13/868,233 (23 pages)—dated Aug. 13, 2013.
Office action for co-pending U.S. Appl. No. 13/868,233 (12 pages)—dated Apr. 15, 2014.
Office action for co-pending U.S. Appl. No. 13/868,233 (8 pages)—dated Oct. 7, 2014.
Office action for co-pending U.S. Appl. No. 13/868,233 (8 pages)—dated Jul. 16, 2015.
Office action for co-pending U.S. Appl. No. 13/868,238 (8 pages)—dated Jul. 16, 2014.
Office action for co-pending U.S. Appl. No. 12/976,379 (7 pages)—dated Jan. 10, 2012.
Office action for co-pending U.S. Appl. No. 12/976,379 (6 pages)—dated Jul. 27, 2012.
Office action for co-pending U.S. Appl. No. 12/976,379 (9 pages)—dated Mar. 7, 2013.
Office action for co-pending U.S. Appl. No. 12/976,379 (8 pages)—dated Aug. 20, 2013.
Office action for co-pending U.S. Appl. No. 12/599,858 (8 pages)—dated May 11, 2011.
Office action for co-pending U.S. Appl. No. 13/341,542 (8 pages)—dated Dec. 26, 2012.
Office action for co-pending U.S. Appl. No. 13/341,542 (7 pages)—dated Feb. 10, 2014.
Office action for co-pending U.S. Appl. No. 14/026,394 (6 pages)—dated Aug. 14, 2014.
Office action for co-pending U.S. Appl. No. 14/272,556 (14 pages)—dated Nov. 20, 2014.
Office action for co-pending U.S. Appl. No. 14/272,556 (12 pages)—dated Sep. 17, 2015.
Office action for co-pending U.S. Appl. No. 14/342,069 (17 pages)—dated Dec. 29, 2015.
Office action for co-pending U.S. Appl. No. 14/342,069 (22 pages)—dated Sep. 2, 2016.
Office action for co-pending U.S. Appl. No. 14/342,069 (21 pages)—dated Sep. 26, 2017.
Office action for co-pending U.S. Appl. No. 14/342,069 (21 pages)—dated Jun. 6, 2018.
Office action for co-pending U.S. Appl. No. 14/649,277 (9 pages)—dated Jul. 22, 2016.
Office action for co-pending U.S. Appl. No. 14/686,915 (8 pages)—dated Nov. 18, 2016.
Office action for co-pending U.S. Appl. No. 14/810,765 (7 pages)—dated Jan. 29, 2016.
Office action for co-pending U.S. Appl. No. 14/828,916 (8 pages)—dated Nov. 25, 2016.
Office action for co-pending U.S. Appl. No. 14/867,502 (9 pages)—dated Nov. 18, 2016.
Office action for co-pending U.S. Appl. No. 15/172,432 (16 pages)—dated Apr. 17, 2017.

(56) References Cited

OTHER PUBLICATIONS

Office action for co-pending U.S. Appl. No. 15/702,087 (5 pages)—dated Nov. 9, 2018.
Office action for co-pending U.S. Appl. No. 15/177,442 (17 pages)—dated May 19, 2017.
Office action for co-pending U.S. Appl. No. 15/378,159 (18 pages)—dated Mar. 2, 2017.
Office action for co-pending U.S. Appl. No. 15/222,122 (8 pages)—dated Nov. 20, 2017.
Office action for co-pending U.S. Appl. No. 15/310,837 (13 pages)—dated Jun. 21, 2018.
Office action for co-pending U.S. Appl. No. 15/411,972 (9 pages)—dated Mar. 28, 2017.
Office action for co-pending U.S. Appl. No. 15/411,972 (8 pages)—dated Nov. 29, 2017.
Office action for co-pending U.S. Appl. No. 15/411,972 (9 pages)—dated Jun. 14, 2018.
Office action for co-pending U.S. Appl. No. 15/116,254 (8 pages)—dated Apr. 26, 2018.
Office action for co-pending U.S. Appl. No. 15/116,254 (10 pages)—dated Aug. 15, 2018.
Office action for co-pending U.S. Appl. No. 15/333,670 (5 pages)—dated Dec. 8, 2017.
Office Action for co-pending U.S. Appl. No. 14/116,048 (10 pages)—dated Jun. 23, 2017.
Office action for co-pending U.S. Appl. No. 15/959,131 (8 pages)—dated Nov. 8, 2019.
Office action for co-pending U.S. Appl. No. 15/822,102 (6 pages)—dated Dec. 6, 2019.
Office action for co-pending U.S. Appl. No. 15/690,623 (6 pages)—dated Jan. 9, 2020.
Other Information—Narrative of verbal disclosure of Brian Swift (1 page)—May 13, 2014.
Petition for Inter Partes Review of U.S. Pat. No. 8,114,210 (52 pages, filed Jun. 12, 2015 by Petitioners Johns Manville Corporation and Johns Manville, Inc.).
Declaration of Dr. Frederick J. Hirsekorn Regarding U.S. Pat. No. 8,114,210 (58 pages, filed Jun. 12, 2015 by Petitioners Johns Manville Corporation and Johns Manville, Inc. in connection with Petition for Inter Partes Review of U.S. Pat. No. 8,114,210).
1st Petition for Inter Partes Review of U.S. Patent No. D631,670 (68 pages, filed Jun. 19, 2015 by Petitioners Johns Manville Corporation and Johns Manville, Inc.).
2nd Petition for Inter Partes Review of U.S. Patent No. D631,670 (62 pages, filed Nov. 2, 2015 by Petitioners Johns Manville Corporation and Johns Manville, Inc.).
Decision of PTAB regarding Institution of Inter Partes Review for U.S. Patent No. D631,670 (33 pages)—Jan. 12, 2016.
Decision2 of PTAB regarding Institution of Inter Partes Review for U.S. Patent No. D631,670 (27 pages)—May 9, 2016.
Final Written Decision of PTAB regarding Inter Partes Review of D631,670 based on 1st Petition (56 pages)—Jan. 11, 2017.
Final Written Decision of PTAB regarding Inter Partes Review of D631,670 based on 2nd Petition (55 pages)—May 8, 2017.
Court of Appeals for Federal Circuit Judgment from Appeal of PTAB Decisions in Inter Partes Reviews of U.S. Patent No. D631,670 (2 pages)—Jul. 13, 2018.
1st Petition for Inter Partes Review of U.S. Pat. No. 8,940,089 (61 pages, filed Jul. 1, 2015 by Petitioners Johns Manville Corporation and Johns Manville, Inc.).
Declaration of Dr. Frederick J. Hirsekorn Regarding U.S. Pat. No. 8,940,089 (70 pages, filed Jul. 1, 2015 by Petitioners Johns Manville Corporation and Johns Manville, Inc. in connection with 1st Petition for Inter Partes Review of U.S. Pat. No. 8,940,089).
2nd Petition for Inter Partes Review of U.S. Pat. No. 8,940,089 (56 pages, filed Jul. 10, 2015 by Petitioners Johns Manville Corporation and Johns Manville, Inc.).
Declaration of Dr. Frederick J. Hirsekorn Regarding U.S. Pat. No. 8,940,089 (67 pages, filed Jul. 10, 2015 by Petitioners Johns Manville Corporation and Johns Manville, Inc. in connection with 2nd Petition for Inter Partes Review of U.S. Pat. No. 8,940,089).
3rd Petition for Inter Partes Review of U.S. Pat. No. 8,940,089 (62 pages, filed Jul. 17, 2015 by Petitioners Johns Manville Corporation and Johns Manville, Inc.).
Declaration of Dr. Frederick J. Hirsekorn Regarding U.S. Pat. No. 8,940,089 (76 pages, filed Jul. 17, 2015 by Petitioners Johns Manville Corporation and Johns Manville, Inc. in connection with 3rd Petition for Inter Partes Review of U.S. Pat. No. 8,940,089).
Declaration of Dr. Elam Leed (11 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
Declaration of Dr. Jonathan Vickers (10 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
1st Petition for Inter Partes Review of U.S. Pat. No. 9,039,827 (60 pages, filed Jul. 29, 2015 by Petitioners Johns Manville Corporation and Johns Manville, Inc.).
Declaration of Dr. Frederick J. Hirsekorn Regarding U.S. Pat. No. 9,039,827 (72 pages, filed Jul. 29, 2015 by Petitioners Johns Manville Corporation and Johns Manville, Inc. in connection with $1^{st}$ Petition for Inter Partes Review of U.S. Pat. No. 9,039,827).
2nd Petition for Inter Partes Review of U.S. Pat. No. 9,039,827 (51 pages, filed Aug. 5, 2015 by Petitioners Johns Manville Corporation and Johns Manville, Inc.).
Declaration of Dr. Frederick J. Hirsekorn Regarding U.S. Pat. No. 9,039,827 (65 pages, filed Aug. 5, 2015 by Petitioners Johns Manville Corporation and Johns Manville, Inc. in connection with $2^{nd}$ Petition for Inter Partes Review of U.S. Pat. No. 9,039,827).
3rd Petition for Inter Partes Review of U.S. Pat. No. 9,039,827 (57 pages, filed Aug. 7, 2015 by Petitioners Johns Manville Corporation and Johns Manville, Inc.).
Declaration of Dr. Frederick J. Hirsekorn Regarding U.S. Pat. No. 9,039,827 (75 pages, filed Aug. 7, 2015 by Petitioners Johns Manville Corporation and Johns Manville, Inc. in connection with $3^{rd}$ Petition for Inter Partes Review of U.S. Pat. No. 9,039,827).
Declaration of Dr. Elam Leed (11 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Declaration of Dr. Jonathan Vickers (10 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Petition for Inter Partes Review of U.S. Pat. No. 9,469,747 (67 pages, filed Mar. 20, 2018 by Petitioners Johns Manville Corporation and Johns Manville, Inc.).
Petition for Inter Partes Review of U.S. Pat. No. 9,828,287 (86 pages, filed Mar. 23, 2018 by Petitioners Johns Manville Corporation and Johns Manville, Inc.).
Petition for Inter Partes Review of U.S. Pat. No. 9,464,207 (78 pages, filed Mar. 28, 2018 by Petitioners Johns Manville Corporation and Johns Manville, Inc.).
Petition for Inter Partes Review of U.S. Pat. No. 9,926,464 (74 pages, filed Mar. 30, 2018 by Petitioners Johns Manville Corporation and Johns Manville, Inc.).
Office Action Granting Ex Parte Reexamination of U.S. Pat. No. 7,888,445, dated Dec. 24, 2013, in U.S. Appl. No. 90/013,029, 11 pages.
Office Action Granting Ex Parte Reexamination of U.S. Pat. No. 7,772,347, dated Dec. 24, 2013, in U.S. Appl. No. 90/013,030, 14 pages.
Office Action Granting Ex Parte Reexamination of U.S. Pat. No. 7,854,980, dated Apr. 15, 2014, in U.S. Appl. No. 90/013,156, 20 pages.
Declaration of Jan Rud Andersen submitted in Ex parte Reexamination U.S. Appl. No. 90/013,030, as Document OTH-C, Oct. 10, 2013, 4 pages.
Final Rejection in Ex Parte Reexamination of U.S. Pat. No. 7,888,445 (20 pages)—Jul. 24, 2015.

(56) References Cited

OTHER PUBLICATIONS

Final Rejection in Ex Parte Reexamination of U.S. Pat. No. 7,772,347 (23 pages)—Jul. 24, 2015.
Final Rejection in Ex Parte Reexamination of U.S. Pat. No. 7,854,980 (31 pages)—Aug. 18, 2015.
Advisory Action in Ex Parte Reexamination of U.S. Pat. No. 7,888,445 (4 pages)—Oct. 6, 2015.
Advisory Action in Ex Parte Reexamination of U.S. Pat. No. 7,772,347 (4 pages)—Oct. 6, 2015.
Advisory Action in Ex Parte Reexamination of U.S. Pat. No. 7,854,980 (4 pages)—Nov. 18, 2015.
Examiner's Answer in Ex Parte Reexamination of U.S. Pat. No. 7,888,445 (8 pages)—Mar. 23, 2016.
Examiner's Answer in Ex Parte Reexamination of U.S. Pat. No. 7,772,347 (8 pages)—Mar. 23, 2016.
Examiner's Answer in Ex Parte Reexamination of U.S. Pat. No. 7,854,980 (8 pages)—Mar. 22, 2016.
Decision of PTAB in Ex Parte Reexamination of U.S. Pat. No. 7,888,445 (17 pages)—Sep. 29, 2016.
Decision of PTAB in Ex Parte Reexamination of U.S. Pat. No. 7,772,347 (18 pages)—Sep. 29, 2016.
Decision of PTAB in Ex Parte Reexamination of U.S. Pat. No. 7,854,980 (22 pages)—Sep. 30, 2016.
Court of Appeals for Federal Circuit Judgment from Consolidated Appeal of PTAB Decisions in Ex Parte Reexamination of U.S. Pat. Nos. 7,888,445, 7,772,347 and 7,854,980 (5 pages)—Mar. 9, 2018.
Notice of Intent to Issue Ex Parte Reexamination Certificate for U.S. Pat. No. 7,772,347 (4 pages)—Oct. 24, 2018.
Notice of Intent to Issue Ex Parte Reexamination Certificate for U.S. Pat. No. 7,888,445 (4 pages)—Dec. 7, 2018.
Decision of USPTO to Reopen Prosecution in Ex Parte Reexamination of U.S. Pat. No. 7,854,980 (7 pages)—Jan. 7, 2019.
Non-final Office Action from Reopened Prosecution in Ex Parte Reexamination of U.S. Pat. No. 7,854,980 (26 pages)—dated Apr. 3, 2019.
Final Office Action from Reopened Prosecution in Ex Parte Reexamination of U.S. Pat. No. 7,854,980 (11 ppages)—dated Aug. 8, 2019.
Notice of Intent to Issue Ex Parte Reexamination Certificate for U.S. Pat. No. 7,854,980 (3 pages)—Oct. 29, 2019.
Notice of Intent to Issue Inter Partes Reexamination Certificate for U.S. Pat. No. 7,807,771 (4 pages)—Jan. 30, 2014.
Notice of Intent to Issue Inter Partes Reexamination Certificate for U.S. Pat. No. 7,854,980 (6 pages)—Aug. 31, 2017.
Decision of PTAB in Inter Partes Reexamination of U.S. Pat. No. 7,888,445 (34 pages)—May 1, 2015.
Decision of PTAB in Inter Partes Reexamination of U.S. Pat. No. 7,772,347 (36 pages)—May 1, 2015.
Decision of PTAB in Inter Partes Reexamination of U.S. Pat. No. 7,854,980 (25 pages)—Jul. 30, 2015.
Remand Order of PTAB in Inter Partes Reexamination of U.S. Pat. No. 7,888,445 (5 pages)—Dec. 9, 2015.
Remand Order of PTAB in Inter Partes Reexamination of U.S. Pat. No. 7,772,347 (5 pages)—Dec. 9 , 2015.
Examiner's Determination on Patent Owner Response/Requester Comments after Board Decision in Inter Partes Reexamination of U.S. Pat. No. 7,888,445 (22 pages)—Oct. 17, 2016.
Examiner's Determination on Patent Owner Response/Requester Comments after Board Decision in Inter Partes Reexamination of U.S. Pat. No. 7,772,347 (17 pages)—Oct. 17, 2016.
Court of Appeals for Federal Circuit Opinion/Judgment from Appeal of PTAB Decision in Inter Partes Reexamination of U.S. Pat. No. 7,854,980 (13 pages)—Feb. 27, 2017.
Final Decision of PTAB in Inter Partes Reexamination of U.S. Pat. No. 7,888,445 (25 pages)—Sep. 8, 2017.
Final Decision of PTAB in Inter Partes Reexamination of U.S. Pat. No. 7,772,347 (24 pages)—Sep. 8, 2017.
Decision of PTAB re Request for Rehearing in Inter Partes Reexamination of U.S. Pat. No. 7,888,445 (7 pages)—Feb. 12, 2018.
Decision of PTAB re Request for Rehearing in Inter Partes Reexamination of U.S. Pat. No. 7,772,347 (7 pages)—Feb. 12, 2018.
Court of Appeals for Federal Circuit Decision re Consolidated Appeal of PTAB Decision in Inter Partes Reexamination of U.S. Pat. No. 7,772,347 and U.S. Pat. No. 7,888,445 (14 pages)—Oct. 15, 2019.
Remand Order of PTAB in Inter Partes Reexamination of U.S. Pat. No. 7,888,445 (3 pages)—Jul. 1, 2020.
Remand Order of PTAB in Inter Partes Reexamination of U.S. Pat. No. 7,772,347 (3 pages)—Jul. 1, 2020.
Decision of PTAB regarding Institution of Inter Partes Review for U.S. Pat. No. 8,114,210 (20 pages)—Oct. 21, 2015.
Final Written Decision of PTAB regarding Inter Partes Review of U.S. Pat. No. 8,114,210 (39 pages)—Oct. 19, 2016.
Court of Appeals for Federal Circuit Judgment from Appeal of PTAB Decision in Inter Partes Review of U.S. Pat. No. 8,114,210 (5 pages)—Jan. 16, 2018.
Decision of USPTO Granting Ex Parte Re-exam of U.S. Pat. No. 8,114,210 (11 pages)—Apr. 9, 2020.
Decision1 of PTAB declining Institution of Inter Partes Review for U.S. Pat. No. 8,940,089 (16 pages)—Dec. 17, 2015.
Decision2 of PTAB declining Institution of Inter Partes Review for U.S. Pat. No. 8,940,089 (19 pages)—Dec. 17, 2015.
Decision3 of PTAB declining Institution of Inter Partes Review for U.S. Pat. No. 8,940,089 (14 pages)—Dec. 17, 2015.
Decision1 of PTAB declining Institution of Inter Partes Review for U.S. Pat. No. 9,039,827 (16 pages)—Jan. 4, 2016.
Decision2 of PTAB declining Institution of Inter Partes Review for U.S. Pat. No. 9,039,827 (19 pages)—Jan. 4, 2016.
Decision3 of PTAB declining Institution of Inter Partes Review for U.S. Pat. No. 9,039,827 (14 pages)—Jan. 4, 2016.
Decision of PTAB denying Institution of Inter Partes Review for U.S. Pat. No. 9,926,464 (29 pages)—Oct. 2, 2018.
Decision of PTAB denying Institution of Inter Partes Review for U.S. Pat. No. 9,464,207 (28 pages)—Oct. 2, 2018.
Decision of PTAB denying Institution of Inter Partes Review for U.S. Pat. No. 9,469,747 (29 pages)—Oct. 3, 2018.
Decision of PTAB denying Institution of Inter Partes Review for U.S. Pat. No. 9,828,287 (22 pages)—Oct. 16, 2018.
Decision of USPTO Granting Ex Parte Re-exam of U.S. Pat. No. 9,828,287 (13 pages)—Jul. 17, 2020.
Decision of USPTO Granting Ex Parte Re-exam of U.S. Pat. No. 9,464,207 (14 pages)—Jul. 31, 2020.
Statement of Revocation Grounds re GB2496951-Claimant Rockwool International (May 21, 2018, 22 pages).
Statement of Revocation Grounds re GB2451719-Claimant Rockwool International (May 18, 2018, 22 pages).
Expert Report re Revocation of GB2451719 and GB2496951-Claimant Rockwool International (Nov. 12, 2018, 11 pages).
United Kingdom Intellectual Property Office, Decision in *Rockwool International* v. *Knauf Insulation Limited*, Application under Section 72 for revocation of patents GB2451719 and GB2496951 (May 28, 2019—18 pages).
Decision of EPO Board of Appeal re Added Matter vis-á-vis EP06788492.4 (Jul. 17, 2019—14 pages).
U.S. Pat. No. 2,965,504—Part 1 (10 pages).
U.S. Pat. No. 2,965,504—Part 2 (14 pages).
U.S. Pat. No. 2,965,504—Part 3 (14 pages).
Gogek Attorney Comments re U.S. Pat. No. 2,965,504—Apr. 6, 1960 (3 pages).
Gogek Affidavit Under Rule 132 re U.S. Pat. No. 2,965,504—Feb. 26, 1960 (3 pages).
Decision of USPTO Granting Ex Parte Re-exam of U.S. Pat. No. 9,926,464 (18 pages)—Aug. 5, 2020.
Decision of USPTO Granting Ex Parte Re-exam of U.S. Pat. No. 8,940,089 (17 pages)—Oct. 16, 2020.
Decision of USPTO Granting Ex Parte Re-exam of U.S. Pat. No. 9,039,827 (16 pages)—Oct. 16, 2020.
Decision of USPTO Granting Ex Parte Re-exam of U.S. Pat. No. 9,469,747 (16 pages)—Nov. 9, 2020.

\* cited by examiner

WOOD PARTICLE BOARDS

CROSS-REFERENCE TO RELATED APPLICATIONS

This application is a U.S. national counterpart application of International Application Serial No. PCT/EP2016/074031, filed Oct. 7, 2016, under 35 U.S.C. § 371, which claims priority to GB Application Serial No. 1517867.6, filed Oct. 9, 2015, the disclosures of which are hereby incorporated herein by reference.

The present invention relates to wood particle boards and a method for their production.

A wood particle board is a composite material manufactured from wood particles, for example wood chips, sawmill shavings and/or saw dust at varying particle sizes held together by a binder and used especially for the manufacture of furniture, such as cabinets, kitchens and bathroom furniture. Generally, wood particle board (which is sometimes referred to as "chipboard") is produced by mixing wood particles and a binder composition, e.g. a thermo-curable resin, subsequently forming the resulting mixture into a sheet or mat and compressing said sheet or mat under elevated temperatures. In order to improve the visual appearance and/or durability, a veneer or melamine layer may be applied to the board's surface(s).

According to one aspect, the present invention provides a method of manufacturing a wood particle board as defined in claim 1. The dependent claims define preferred or alternative embodiments.

The presence of the non-carbohydrate polyhydroxy component of the binder composition may be useful to i) facilitate an even distribution of the binder composition over individual wood particles and/or over a collection of wood particles which are mixed or processed together and/or ii) provide an appropriate quantity of moisture for the resinated wood particles. A binder composition that cannot easily flow or be distributed may lead to clumping of resinated wood particles and/or to a non-homogenous material mix at entry into board press. The non-carbohydrate polyhydroxy component may act as a lubricant and/or a non-drying liquid; this may reduce or prevent clumping of the resinated wood particles.

The resinated wood particles may be mixed or tumbled, for example in a bunker, prior to being formed in to a mat; the non-carbohydrate polyhydroxy component may facilitate binder distribution over surfaces of the wood particles during such mixing. Furthermore, the use of a non-carbohydrate polyhydroxy component may avoid the necessity of providing additional water or diluting the binder composition to facilitate binder distribution and thus avoid the generation of undesired quantities of steam during subsequent curing.

The non-carbohydrate polyhydroxy component may be selected from: a diol, a triol, a polyol, an organic compound containing multiple hydroxyl groups and mixtures thereof. It may comprise, comprise at least 50 wt % or consist essentially of glycerol, polyethylene glycol, polypropylene glycol, trimethylolpropane, pentaerythritol, polyvinyl alcohol, partially hydrolyzed polyvinyl acetate, fully hydrolyzed polyvinyl acetate, or mixtures thereof. Glycerol is particularly preferred because it can be acquired as a cost efficient waste product from other industrial processes, is bio based and is non-hazardous chemical.

The non-carbohydrate polyhydroxy component may have a viscosity when measured at 20° C. which is:

greater than or equal to: 10 cP, 50 cP, 100 cP or 250 cP or 500 cP or 750 cP or 1000 cP or 1250 cP; and/or less than or equal to: 10000 cP or 7500 cP or 5000 cP or 2500 or 2000 cP or 1500 cP;

notably when the viscosity is measured at 20° C. The viscosity of the non-carbohydrate polyhydroxy component and of the binder composition is measured by rotational viscometry notably using a Brookfield viscometer. One such viscosity measurement involves applying a torque through a calibrated spring to a spindle immersed in a test fluid, the amount of viscous drag indicated by the spring deflection providing a measure of the viscosity.

The non-carbohydrate polyhydroxy component may be used in a quantity of:

at least 0.1% or at least 1%, or at least 2% or at least 5% and/or no more than 25% or no more than 20% or no more than 15% by weight based on the total weight of the binder composition.

The term "binder composition" as used herein means all ingredients applied to the wood particles and/or present on the wood particles, notably prior to curing, (other than the wood particles themselves and any moisture in the wood particles), including reactants, solvents (including water), the non-carbohydrate polyhydroxy component(s) and additives. The term "dry weight of the binder composition" as used herein means the weight of all components of the binder composition other than any water that is present (whether in the form of liquid water or in the form of water of crystallization).

The binder composition applied to the wood particles comprises uncured reactants which cure and cross-link to form a cured binder which holds the particles of the wood particle board together. The binder composition comprises starting materials that will form a thermoset resin upon curing. The reactants may comprise components selected from the group consisting of: protein(s), starch(es), cellulose, carbohydrate(s), gum(s), natural resin(s), bitumen(s), natural rubber(s), synthetic rubber(s), phenolic(s) such as tannin or lignin, notably present in a quantity of at least 30%, at least 40%, at least 50%, at least 60%, at least 70% or at least 80% by dry weight based on the total dry weight of the binder composition.

The binder composition is preferably free of, or comprises no more than 5 wt % or no more than 10 wt % urea formaldehyde (UF), melamine urea formaldehyde (MUF) and/or phenol formaldehyde.

The binder composition is preferably a binder that does not comprise any added formaldehyde. It may be "substantially formaldehyde free", that is to say that it liberates less than 5 ppm formaldehyde as a result of drying and/or curing (or appropriate tests simulating drying and/or curing); more preferably it is "formaldehyde free", that is to say that it liberates less than 1 ppm formaldehyde in such conditions.

Advantageously, the binder composition may be a carbohydrate based binder composition. The combination of this with the non-carbohydrate polyhydroxy component(s) has been found to provide an advantageous combination of bond strength, notably without penalizing cure speed, whilst facilitating manufacturing processes. The binder composition may comprise (a) reducing sugar reactant(s) and nitrogen-containing reactant(s) and/or (b) curable reaction product(s) of reducing sugar reactant(s) and nitrogen-containing reactant(s). The reducing sugar reactants may be provided in the form of reducing sugars and/or generated in situ, notably from a carbohydrate reactant which yields reducing sugar(s)

in situ, for example due to application of heat and/or presence of a catalyst or further reactant.

The binder composition may comprise a binder composition as described in any of WO 2007/014236, WO 2009/019232, WO 2009/019235, WO 2011/138458, WO 2011/138459 or WO 2013/150123, each of which is hereby incorporated by reference.

The nitrogen-containing reactant(s) and the reducing sugar reactant(s) (or their reaction product(s)) may be Maillard reactants that react to form Maillard reaction products, notably melanoidins when cured. Curing of the binder composition may comprise or consist essentially of Maillard reaction(s). The cured binder composition may comprise melanoidin-containing and/or nitrogenous-containing polymer(s); it is preferably a thermoset binder and is preferably substantially water insoluble.

The reducing sugar reactant may comprise: a monosaccharide, a monosaccharide in its aldose or ketose form, a disaccharide, a polysaccharide, a triose, a tetrose, a pentose, xylose, an hexose, dextrose, fructose, a heptose, a sugar, molasses, starch, starch hydrolysate, cellulose hydrolysates, reaction product(s) thereof or mixtures thereof. The reducing sugar reactant(s), or carbohydrate reactant(s) that yield the reducing sugar reactant(s) may have a dextrose equivalent of at least about 50, at least about 60, at least about 70, at least about 80 or at least about 90. The reducing sugar reactant may comprise or consist of high fructose corn syrup (HFCS).

As used herein, the term "nitrogen-containing reactant" means any chemical compound, or mixture of compounds, which contain(s) at least one nitrogen atom and which is/are capable of reacting with the at least one reducing sugar reactant. The nitrogen-containing reactant may be selected from $NH_3$, an inorganic amine or an organic amine comprising at least one primary amine group, as well as salts thereof. It may comprise $NH_3$ used as such (e.g. in form of an aqueous solution), or an inorganic and organic ammonium salt, for example ammonium sulfate ($AmSO_4$), ammonium phosphate, e.g. diammonium phosphate, ammonium chloride, ammonium nitrate or ammonium citrate.

The nitrogen-containing reactant may be a polyamine. Herein, the term "polyamine" includes any organic compound having two or more amine groups, which may independently be substituted or unsubstituted. For example, the polyamine may be a primary polyamine. As used herein, a "primary polyamine" is an organic compound having two or more primary amine groups ($-NH_2$). Within the scope of the term primary polyamine are those compounds which can be modified in situ or isomerize to generate a compound having two or more primary amine groups ($-NH_2$). The primary polyamine may be a molecule having the formula $H_2N$-Q-$NH_2$, wherein Q is an alkanediyl, cycloalkanediyl, heteroalkanediyl, or cycloheteroalkanediyl, each of which may be optionally substituted. For example, Q may be an alkanediyl group selected from $-C_2$-$C_{24}-$, an alkanediyl group selected from $-C_2$-$C_9-$, or an alkanediyl group selected from $-C_3$-$C_7-$. According to a preferred embodiment, Q is a $C_6$ alkanediyl. According to another embodiment, Q may be a cyclohexanediyl, cyclopentanediyl or cyclobutanediyl, or a divalent benzyl radical. In this context, it should be noted that certain authors prefer using the term "alkyl" instead of the chemically more correct "alkanediyl" nomenclature; the same chemical group is meant.

As used herein, the term "alkanediyl" means a chain of carbon atoms, which may optionally be branched, preferably of limited length, including $-C_1$-$C_{24}-$, $-C_1$-$C_{12}-$, $-C_1$-$C_8-$, $-C_1$-$C_6-$, and $-C_1$-$C_4-$. Shorter alkanediyl groups may add less lipophilicity to the compound and accordingly will have different reactivity towards the reducing sugar reactant and/or solubility.

As used herein, the term "cycloalkanediyl" means a chain of carbon atoms, which may optionally be branched, where at least a portion of the chain is cyclic and also includes polycyclic structures, for example, cyclopropanediyl, cyclopentanediyl, cyclohexanediyl, 2-methylcyclopropanediyl, 2-ethylcyclopentanediyl, adamantanediyl. Furthermore, the chain forming cycloalkanediyl is advantageously of limited length, including $-C_3$-$C_{24}-$, $-C_3$-$C_{12}-$, $-C_3$-$C_8-$, $-C_3$-$C_6-$, and $-C_6$-$C_6-$. Shorter alkanediyl chains forming cycloalkanediyl may add less lipophilicity to the compound and accordingly will have a different behavior.

As used herein, the term "heteroalkanediyl" means a chain of atoms that includes both carbon and at least one heteroatom, and is optionally branched. Examples of such heteroatoms include nitrogen, oxygen, and sulfur. In certain variations, said hetero-atoms also include phosphorus, and selenium. In one embodiment, the heteroalkanediyl is a polyether. As used herein, the term "cycloheteroalkanediyl", includes a chain of atoms that includes both carbon and at least one heteroatom, such as heteroalkanediyl, and may optionally be branched, where at least a portion of the chain is cyclic. Particularly, examples of cycloheteroalkanediyl include divalent tetrahydrofuryl, pyrrolidinyl, tetrahydropyranyl, piperidinyl, morpholinyl, piperazinyl, homopiperazinyl, quinuclidinyl.

Herein, the term "optionally substituted" means the replacement of one or more hydrogen atoms with other functional groups. Such other functional groups may include amino, hydroxyl, halo, thiol, alkyl, haloalkyl, heteroalkyl, aryl, arylalkyl, arylheteroalkyl, nitro, sulfonic acids and derivatives thereof, carboxylic acids and derivatives thereof.

The primary polyamine may be a diamine, triamine, tetramine, or pentamine, for example: a triamine selected from a diethylenetriamine, 1-piperazineethaneamine, or bis(hexamethylene)triamine; triethylenetetramine; or tetraethylenepentamine.

One feature of the primary polyamine is that it may possess low steric hindrance. For example, 1,2-diaminoethane, 1,4-diaminobutane, 1,5-diaminopentane, 1,6-diaminohexane, 1,12-diaminododecane, 1,4-diaminocyclohexane, 1,4-diaminoben-zene, diethylenetriamine, triethylenetetramine, tetraethylenepentamine, 1-piperazine-ethaneamine, 2-methyl-pentamethylenediamine, 1,3-pentanediamine, and bis(hexamethylene)triamine, as well as 1,8-diaminooctane have low steric hindrance.

Preferably, the nitrogen-containing reactant comprises or consists of 1,6-diaminohexane (hexamethylenediamine, HMDA) or 1,5-diamino-2-methylpentane (2-methyl-pentamethylenediamine).

In another embodiment, the nitrogen-containing reactant comprises or consists of a polyether-polyamine, which may be a diamine or a triamine, for example a trifunctional primary amine having an average molecular weight of 440 known as Jeffamine T-403 Polyetheramine (e.g. Huntsman Corporation).

In a further embodiment, the nitrogen-containing reactant may comprise or consist of a polymeric polyamine, for example chitosan, polylysine, polyethylene imine, poly(N-vinyl-N-methyl amine), polyaminostyrene, polyvinyl amine (which can be a homopolymer or a copolymer).

The reducing sugar reactant(s), may make up:
at least 30%, preferably at least 40%, preferably at least 50%, more preferably at least 60%, more preferably at least 70%, even more preferably at least 80% by dry weight of the binder composition; and/or less than 97%, more preferably less than 95% by dry weight of the binder composition.

The nitrogen-containing reactant(s) may make up:

less than 50% or 40%, preferably less than 30%, more preferably less than 25% by dry weight of the binder composition; and/or at least 2.5%, preferably at least 5%, more preferably at least 10% by dry weight of the binder composition.

The binder composition may comprise (i) at least 25%, and preferably at least 40%, at least 50% or at least 60% by dry weight of: (a) reducing sugar reactant(s) and nitrogen-containing reactant(s) and/or (b) curable reaction product(s) of reducing sugar reactant(s) and nitrogen-containing reactant(s).

The ratio of carbonyl groups in the reducing sugar reactant(s) to reactive amino groups in the nitrogen-containing reactant(s) may be in the range of 5:1 to 1:2. For example, the ratio of carbonyl groups to reactive amino groups may be in the range of 5:1 to 1:1.8, 5:1 to 1:1.5, 5:1 to 1:1.2, 5:1 to 1:1, 5:1 to 1:0.8 and 5:1 to 1:0.5. Further examples include ratios such as 4:1 to 1:2, 3.5:1 to 1:2, 3:1 to 1:2, 2.5:1 to 1:2, 2:1 to 1:2 and 1.5:1 to 1:2.

Herein, the term "reactive amino group" means any amino group in the nitrogen-containing reactant(s) which is capable of reacting with the carbohydrate component. Specifically, examples of such reactive amino groups include primary and secondary amino groups, amide groups, imine and imide groups, as well as cyanate and isocyanate groups.

The binder composition may include ester and/or polyester compounds.

The binder composition may comprise one or more adjuvants, for example waxes, dyes release agents and formaldehyde scavengers (notably urea, tannins, quebracho extract, ammonium phosphate, bisulfite).

The binder composition may be applied to the wood particles, in the form of an aqueous composition, preferably an aqueous solution or dispersion, notably in which the dry weight of the aqueous binder composition makes up: ≥40 wt %, ≥45 wt %, ≥50 wt %, ≥55 wt % or ≥60 wt % and/or ≤95 wt %, ≤90 wt %, ≤85 wt % or ≤80 of the total weight of the aqueous binder composition. The presence of the non-carbohydrate polyhydroxy component(s) is particularly advantageously when the binder composition is used at a high solid content, notably ≥55 wt %, to facilitate even distribution of the binder composition over the resinated wood particles despite the high solid content.

The binder composition, notably in the state in which it is applied to the wood particles may have a viscosity which is:

greater than or equal to: 10 cP, 25 cP, 50 cP, 75 cP or 85 cP or 95 cP or 105 cP or 115 cP or 125 cP; and/or less than or equal to: 250 cP or 225 cP or 200 cP or 175 cP or 150 cP; notably when the viscosity is measured at 20° C.

The term "wood particle" used herein means wood particles or fibers, including wood chips, wood flakes, sawmill shavings and saw dust or mixtures thereof. The wood particles may have granular sizes of 0.05-10 mm or 1-10 mm. The wood particle board may be a multi-layer wood particle board; in this case, the particles used for the core layer may have granular sizes between 0.05-10 mm or 1-10 mm and the surface layer particles may have a granular size less than 1.5 mm. The aforementioned granular sizes are in respect of at least 90% by weight of the wood particles, preferably at least 95% by weight. Wood particles from both virgin wood and/or reclaimed wood may be used; the wood may comprise, but are not limited to, birch, beech, alder, pine, spruce tropical wood or wood mixtures. Preferably, the wood particles contacted with the binder composition have a moisture content of less than 8%, less than 6% or less than 5% moisture, for example due to pre-drying; they may be pre-dried to a moisture content of 1 to 5% moisture, e.g. 2 to 4% moisture or 1.5 to 3.5% moisture.

The particle boards of the invention may comprise boards commonly called particle boards or oriented strand boards or medium density fiber boards or high density fiber boards.

The wood particle boards, notably once cured, may comprise at least 70%, at least 80%, at least 90% or at least 95% by weight of wood particles.

The wood particle boards, notably once cured, may comprise at least 0.025%, at least 0.05%, at least 0.075% or at least 1% and/or less than 5%, less than 4%, less than 3% or less than 2% of the non-carbohydrate polyhydroxy component(s) by dry weight of the finished particle board. When the particle is a multi-layer board in which the non-carbohydrate polyhydroxy component(s) is not present in all of the layers, the above result may be obtained in respect only of the layer(s) containing the non-carbohydrate polyhydroxy component(s).

The quantitative determination of the non-carbohydrate polyhydroxy component(s) may be made by HPLC (high-pressure liquid chromatography) after an extractive process. The extractive process may consist of a sample of the finished particle board broken into a small piece (for example 2 g) and placed into hot water. The sample in the hot water may be sonicated in an ultrasonic bath (for example during 15 minutes) and then the extrac may be filtered and introduced to a HPLC column. For quantification of glycerol, or other low molecular weight non-carbohydrate polyhydroxy component, an example of a suitable column may be a Luna NH2 (250 mm*4.6 mm*5 microns) eluted with a mobile phase of 10% water and 90% acetonitrile.

The thickness of the wood particle board may be ≥5 mm, ≥8 mm, ≥10 mm, or ≥15 mm and/or ≤100 mm, ≤80 mm, ≤60 mm, ≤50 mm, ≤45 mm or ≤25 mm. Preferred thicknesses are in the range of 10 to 45 mm or 16 to 22 mm. The length of the particle board may be ≥1.5 m, ≥2 m, ≥2.5 m or ≥3 m and/or ≤8 m, ≤6 m or ≤5 m. The width of the particle board may be ≥1 m, ≥1.2 m, ≥1.5 m or ≥1.8 m and/or ≤4 m, ≥3 m or ≥3.5 m.

The wood particle boards may have edges which are trimmed and/or cut and/or machined; they may be piled up and provided as a package comprising a plurality of boards arranged and/or bound together, for example to facilitate transport; the package may comprise an enveloping film, for example of a plastics material.

The binder composition may be applied to the wood particles as a single binder composition, for example by all ingredients of the binder composition being mixed together before being applied as a single spray or projection to the wood particles. Alternatively, two or more portions of the binder composition may be applied separately. For example, the non-carbohydrate polyhydroxy component may be applied to the wood particles separately from the rest of the binder composition. The binder composition may be applied to the wood particles by spraying, for example by passing the wood particles through a spray of the binder composition or by spraying the binder composition over the wood particles whilst the wood particles are being mixed. Preferably, the wood particles are mixed subsequently to application of the binder composition, for example by tumbling, notably in a mixer or bunker. Mixing of the wood particles with the binder composition may comprise applying the binder composition to the wood particles, preferably with subsequent additional mixing of the wood particles, for example by tumbling.

During the curing of the wood particle board, the internal temperature of the board, notably the temperature at the centre of the board in its thickness direction, may be raised to a temperature of:
a) ≥100° C., ≥110° C., ≥115° C., ≥120° C., ≥130° C. or ≥140° C., and/or
b) ≤200° C., ≤180° C., ≤170° C. or ≤160° C.

The curing temperature may range from 110° C. to 280° C. Further examples of the curing temperature include ranges of 110 to 260° C., to 240° C., to 220° C. or to 210° C.

The mat of resinated particles may be pressed, e.g. in a hot press, at a pressure which is ≥20 bar, ≥25 bar or ≥30 bar and/or ≤80 bar, ≤75 bar, ≤70 bar or ≤65 bar to obtain a cured particle board.

The mat of resinated particles may be pressed at a press factor in second per mm of thickness of the wood particle board which is ≥2 seconds/mm, ≥3 seconds/mm, ≥4 seconds/mm or ≥5 seconds/mm and/or ≤60 seconds/mm, ≤40 seconds/mm, ≤30 seconds/mm or ≤20 seconds/mm to obtain a cured particle board. Thus, the press-time may depend on the thickness of the wood particle board.

Embodiments of the invention will now be described, by way of example only, with reference to the accompanying images of which.

EXAMPLE 1

Two wood particle boards, samples A1 and A2, of length and width 300×300 mm having a thickness of 16 mm and a target density of 650 kg/m$^3$ were prepared. Once dried to a residual moisture content of about 3.5 wt % (based on oven dried wood weight) the wood particles were sprayed with the binder composition and thoroughly mixed by tumbling: Both wood particleboards were three layer particle boards and were made with Urea Formaldehyde (UF) resinated core chips at a 62:38 ratio of core:surface wood chip mass. The UF was 95.5 parts by weight (66.72 g, 66% solid) of UF resin and 4.5 parts by weight (3.81 g, 52% solid) ammonium nitrate catalyst Surface Layer Binder Composition of Sample A1: According to the Invention 43.5 parts by weight (19.2 g) of dextrose monohydrate (DMH 90.9 wt % dextrose and 9.1 wt % water of crystallisation), 43.5 parts by weight (17.45 g, 100% solid) of fructose, 13.00 parts by weight (7.45 g, 70 wt % in H$_2$O) of HMDA (hexamethylenediamine, 1,6-hexanediamine) and addition of 5 parts by weight (2.91 g, 69% solid) glycerol. The solid content was 69 wt %

Surface Layer Binder Composition of Sample A2: Comparative Example 43.5 parts by weight (19.2 g) of dextrose monohydrate (DMH 90.9 wt % dextrose and 9.1 wt % water of crystallisation), 43;5 parts by weight (17.45 g, 100% solid) of fructose, 13.00 parts by weight (7.45 g, 70 wt % in H$_2$O) of HMDA (hexamethylenediamine, 1,6-hexanediamine) The solid content was 69 wt %.

A mass of coated wood particles adapted to achieve a target board density of 650 kg/m$^3$ was transferred into a forming box in order to form board samples of 300×300×16 mm. The loading of the binder composition is of 10% on surface chips and 7.5% on core chips. Board samples were pressed under 56 bar, to a thickness of 16 mm using metal stops, at a target platen temperature of 230° C. for a given time period such as to reach a press factors of 7 s per mm thickness for a 16 mm thick board.

Figure 1:
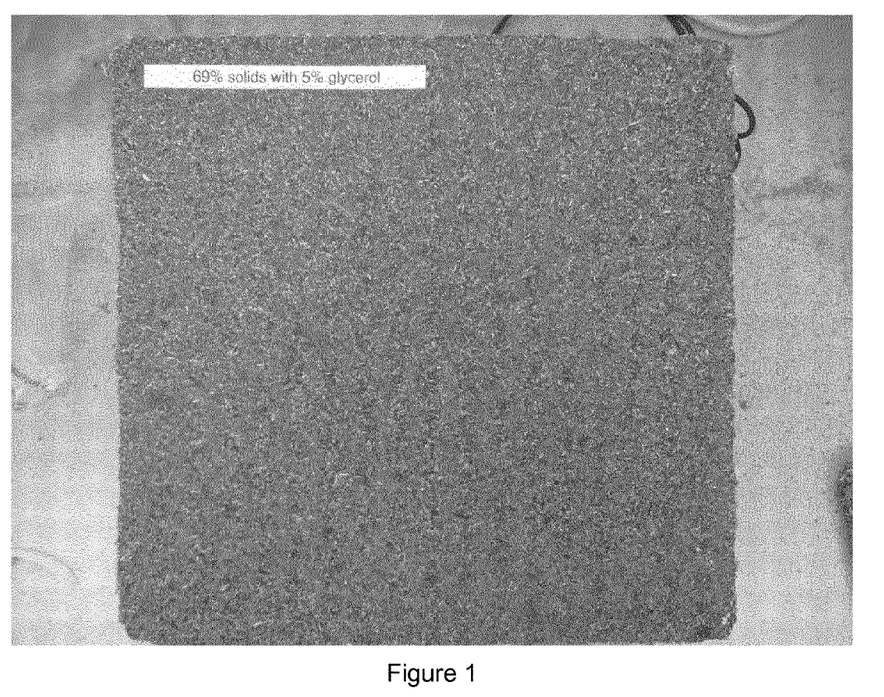
FIG. 1 is a representation of a wood particle board made in accordance with the invention.

FIG. 1 shows the particle board of sample A1.

Figure 2:
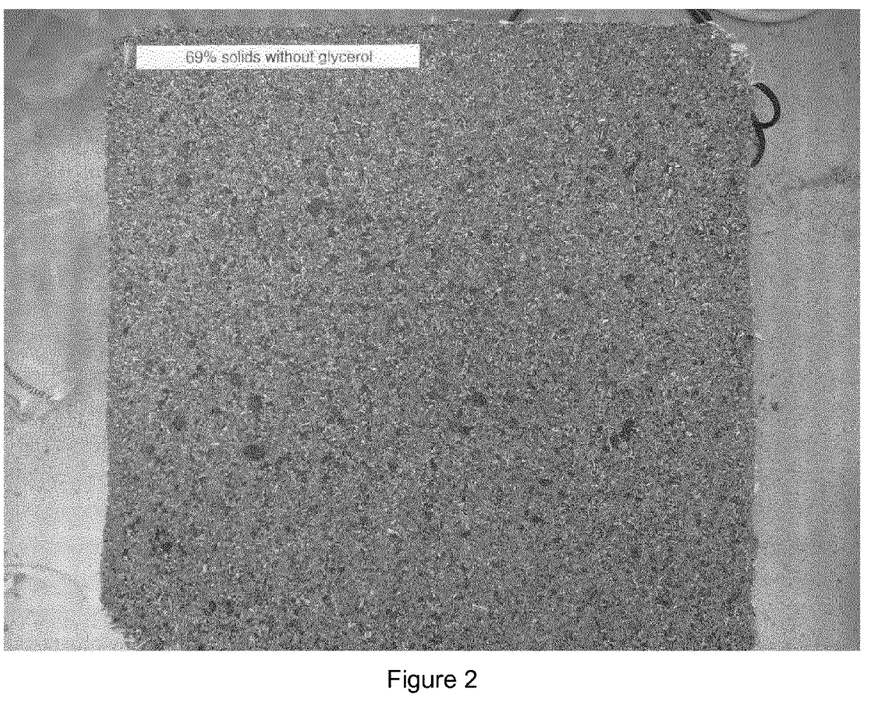
FIG. 2 is a representation of a comparative example.

FIG. 2 shows the particle board of sample A2.

The comparative example of Sample A2 in FIG. 2 shows that several spots are clearly visible. These spots are believed to be clumpings of the wood particles with binder due to poor binder distribution. Such clumping can lead to non-homogeneous properties of the wood particle board, notably affecting bond strength and/or breaking resistance.

FIG. 1 shows reduced presence of spots.

What is claimed is:

1. A method of manufacturing a wood particle board comprising wood particles bound by a cured thermoset binder comprising:
   a) mixing wood particles with a binder composition having a dry weight comprising at least 40% by weight (wt. %) of the binder composition to produce resinated wood particles comprising wood particles coated with the binder composition;
   b) forming a resinated mat comprising the resinated wood particles arranged in the form of a mat of loosely arranged resinated wood particles; and
   c) forming a wood particle board by curing the binder composition while subjecting the resinated mat to pressure; wherein the binder composition comprises 0.1-25 wt. % of at least one non-carbohydrate polyhydroxy component comprising a viscosity at 20° C. of 10-10,000 cP for reducing or eliminating resinated wood particle clumping.

2. The method of claim 1, wherein the at least one non-carbohydrate polyhydroxy component is selected from the group consisting of glycerol, a polyalkylene glycol, polyethylene glycol, polypropylene glycol, trimethylolpropane, pentaerythritol, polyvinyl alcohol, partially hydrolyzed polyvinyl acetate, fully hydrolyzed polyvinyl acetate and mixtures thereof.

3. The method of claim 1, wherein the binder composition comprises an aqueous binder composition selected from an aqueous solution or dispersion comprising 40-95 wt. % solids, based on the total weight of the aqueous binder composition.

4. The method of claim 1, wherein the at least one non-carbohydrate polyhydroxy component comprises 1-20 wt. % of the binder composition.

5. The method of claim 1, wherein the binder composition comprises at least 30% by dry weight of a carbohydrate reactant.

6. The method of claim 1, wherein the binder composition comprises
   (a) at least one reducing sugar reactant and at least one nitrogen-containing reactant; and/or
   (b) at least one curable reaction product of at least one reducing sugar reactant and at least one nitrogen-containing reactant; wherein the combined weight of (a) and (b) comprises at least 30% by dry weight of the binder composition.

7. The method of claim 6, wherein the at least one reducing sugar reactant is selected from the group consisting of monosaccharides, disaccharides, polysaccharides and combinations thereof.

8. The method of claim 6, wherein the at least one nitrogen-containing reactant is selected from the group consisting of $NH_3$, an inorganic amine, an organic amine comprising at least one primary amine group, a salt thereof and combinations thereof.

9. The method of claim 6, wherein the at least one nitrogen-containing reactant comprises a polyamine having the general chemical structure $H_2N$—Q—$NH_2$, wherein Q is an alkanediyl selected from the group consisting of a —$C_2$—$C_{24}$— group, a $C_6$ alkanediyl group, a cycloalkanediyl group, a cyclohexanediyl group, a cyclopentanediyl group, a cyclobutanediyl group, a heteroalkanediyl group, a cycloheteroalkanediyl group, chemically substituted variants thereof and combinations thereof.

10. The method of claim 9, wherein the polyamine is selected from a polyether-polyamine, a polymeric polyamine and combinations thereof.

11. A wood particle board produced in accordance with the method of claim 1.

12. The wood particle board of claim 11, comprising wood particles held together by a cured, thermoset binder, wherein the wood particle board comprises at least 1-20 wt. % of at least one non-carbohydrate polyhydroxy component.

13. The wood particle board of claim 11, comprising a multilayer wood particle board comprising wood particles held together by a cured, thermoset binder, wherein at least one layer of the wood particle board comprises at least 1-20 wt. % of at least one non-carbohydrate polyhydroxy component.

14. The method of claim 1, wherein the at least one non-carbohydrate polyhydroxy component comprises 2-18 wt. % of the binder composition.

15. The method of claim 1, wherein the at least one non-carbohydrate polyhydroxy component comprises 5-10 wt. % of the binder composition.

16. The method of claim 6, wherein the polyamine is selected from 1,6-diaminohexane (hexamethylenediamine (HMDA)), 1,5-diamino-2-methylpentane (2-methyl-pentamethylenediamine) and combinations thereof.

17. The method of claim 6, wherein the at least one nitrogen-containing reactant comprises a polyamine having the general chemical structure $H_2N$—Q—$NH_2$, wherein Q is a divalent benzyl radical.

18. The method of claim 1, wherein the at least one non-carbohydrate polyhydroxy component comprises a viscosity at 20° C. of 100-5,000 cP.

* * * * *

(12) SUPPLEMENTAL EXAMINATION CERTIFICATE

United States Patent  
Hand

(10) Number: US 10,864,653 F1  
(45) Certificate Issued: Mar. 11, 2024

Control No.: 96/050,026  
Primary Examiner: Jerry D Johnson

Filing Date: Feb. 26, 2024

No substantial new question of patentability is raised in the request for supplemental examination. See the Reasons for Substantial New Question of Patentability Determination in the file of this proceeding.

(56) Items of Information

OTHER DOCUMENTS

Declarations of Richard Hand dated April 1, 2020 and October 7, 2020.

Supplemental Declaration of Richard Hand dated October 18, 2023.